United States Patent
Urban et al.

[11] Patent Number: 5,989,333
[45] Date of Patent: Nov. 23, 1999

[54] MIXED CRYSTAL PIGMENTS OF THE QUINACRIDONE SERIES

[75] Inventors: Manfred Urban, Wiesbaden; Martin Boehmer, Neu-Anspach; Dieter Schnaitmann, Eppstein, all of Germany

[73] Assignee: Clariant GmbH, Frankfurt, Germany

[21] Appl. No.: 09/127,363

[22] Filed: Jul. 31, 1998

[30] Foreign Application Priority Data

Aug. 4, 1997 [DE] Germany ............... 197 33 642

[51] Int. Cl.⁶ ............... C09B 67/52; C08K 5/34
[52] U.S. Cl. ............... 106/495; 106/31.77; 106/159.1; 106/170.1; 106/173.01; 106/241; 106/497; 524/86; 546/49; 546/56
[58] Field of Search ............... 106/495, 497, 106/159.1, 170.01, 173.01, 241, 31.77; 546/49, 56; 524/86

[56] References Cited

U.S. PATENT DOCUMENTS

| | | | |
|---|---|---|---|
| 3,160,510 | 12/1964 | Ehrich | 106/495 |
| 3,836,379 | 9/1974 | Kirsch et al. | 106/495 |
| 4,099,980 | 7/1978 | North | 106/495 |
| 4,777,105 | 10/1988 | Macholdt et al. | 106/495 |
| 4,895,949 | 1/1990 | Jaffe et al. | 546/56 |
| 5,236,498 | 8/1993 | Zaloum et al. | 106/495 |
| 5,591,258 | 1/1997 | Urban et al. | 106/495 |
| 5,614,014 | 3/1997 | Urban | 106/497 |
| 5,755,872 | 5/1998 | Urban et al. | 106/495 |
| 5,755,874 | 5/1998 | Urban et al. | 106/497 |

FOREIGN PATENT DOCUMENTS

| | | | |
|---|---|---|---|
| 244453 | 12/1961 | Australia | 106/495 |
| 1569787 | 7/1970 | Germany. | |
| 955854 | 4/1964 | United Kingdom. | |

OTHER PUBLICATIONS

European Search Report (Dec. 1998).
Derwent Abstract—EP 655485 (May 1995).
Derwent Abstract—EP 799862 (Oct. 1997).
Derwent Abstract—EP 348347 (Dec. 1989).

*Primary Examiner*—Anthony Green
*Attorney, Agent, or Firm*—Susan S. Jackson

[57] ABSTRACT

Mixed crystal pigments of the quinacridone series New quinacridone mixed crystal pigments consisting of a) from 85 to 99% by weight of unsubstituted β-phase quinacridone of the formula (I)

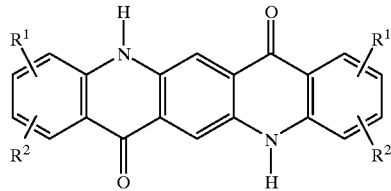

(I)

in which $R^1$ and $R^2$ are hydrogen atoms and b) from 1 to 15% by weight of one or more substituted quinacridones of the formula (I) in which the substituents $R^1$ and $R^2$ are identical or different and are chlorine, bromine or fluorine atoms or $C_1$–$C_4$-alkyl, $C_1$–$C_4$-alkoxy or carboxamido groups which can be substituted by $C_1$–$C_6$-alkyl groups, and $R^1$ may additionally be hydrogen, are valuable quinacridones in the red-violet range.

13 Claims, 3 Drawing Sheets

MIXED CRYSTAL PIGMENTS OF THE QUINACRIDONE SERIES

BACKGROUND OF THE INVENTION

Quinacridones are known compounds which are used as pigments. In practice, stringent requirements are placed on their fastness and color properties. On the industrial scale they are prepared by oxidizing dihydroquinacridones in an alkali medium in the presence of solvents and then dry- or wet-grinding the resulting coarsely crystalline crude pigments, or by ring closure of 2,5-dianilinoterephthalic acid in polyphosphoric acid or polyphosphoric ester and then phase-converting and finishing the resulting finely divided crude pigments with organic solvents.

The preparation of quinacridone mixed crystal pigments is described in the following patent documents.

U.S. Pat. No. 4,099,980 describes the preparation of quinacridone mixed crystal pigments, consisting of unsubstituted quinacridone and 4,11-dichloroquinacridone, which are, however, in the y phase of the unsubstituted quinacridone.

U.S. Pat. No. 3,160,510 describes the preparation of quinacridone mixed crystal pigments by dry-milling the crude pigment mixtures with salt and then solvent-treating the isolated ground materials or by precipitating the pigment mixtures with sulfuric acid and then solvent-treating the dried finely divided crude pigments.

SUMMARY OF THE INVENTION

The present invention relates to novel quinacridone mixed crystal pigments and to their use as colorants for coloring high molecular mass organic materials.

The object of the present invention was to expand in color terms the scope of application of quinacridone pigments in the direction in particular of the red-violet region.

It has been found that mixtures comprising 85–99% unsubstituted β-phase quinacridone and 1–15% of one or more, especially 1 or 2, variously substituted quinacridones will form mixed crystals, also referred to as solid solutions, under certain conditions defined in accordance with the invention. By mixed crystals are understood systems in which one or more components added—usually in a nonstoichiometric ratio—to a crystal phase crystallize together with the host compound in a common lattice. The X-ray diffraction diagram of a mixed crystal shows, for example, only the reflections of the (in many cases expanded) crystal lattice of the host compound or else of a similar crystal lattice or else of a markedly different crystal lattice, whereas the reflections of all the components can be detected in the X-ray diffraction diagram of the corresponding mechanical mixture.

BRIEF DESCRIPTION OF THE DRAWINGS

FIGS. 1–6 show the following X-ray diffraction spectra:

DESCRIPTION OF THE PREFERRED EMBODIMENTS

The invention provides mixed crystal pigments of the quinacridone series consisting of a) from 85 to 99% by weight, in particular from 87 to 95% by weight, of unsubstituted β-phase quinacridone of the formula (I)

in which $R^1$ and $R^2$ are hydrogen atoms and b) from 1 to 15% by weight, in particular from 5 to 13% by weight, of one or more substituted quinacridones of the formula (I) in which the substituents $R^1$ and $R^2$ are identical or different and are chlorine, bromine or fluorine atoms or $C_1$–$C_4$-alkyl, $C_1$–$C_4$-alkoxy or carboxamido groups which can be substituted by $C_1$–$C_6$-alkyl groups, and $R^1$ can additionally be hydrogen.

Preferred mixed crystal pigments are those which comprise one or two compounds (b) of the formula I in which $R^1$ denotes hydrogen, chlorine atoms, methyl or carboxamido groups, and $R^2$ denotes chlorine atoms, methyl or carboxamido groups.

The color properties of the mixed crystal pigments of the invention differ considerably from those of the corresponding mechanical mixtures of the individual components. In particular, they possess purer hues and have higher color strengths. The hues obtained cannot be established with the individual components or with the prior art mixed crystals, especially in the red-violet region. The fastness properties are excellent.

The present invention also provides a process for preparing the above-described mixed crystal pigments, which comprises cyclizing the 2,5-dianilinoterephthalic acid on which the compound (a) is based and the substituted terephthalic acid(s) on which the compound (b) is based in a ratio of from 85:15 to 99:1, in particular from 87:13 to 95:5, in the presence of polyphosphoric acid and/or polyphosphoric esters, hydrolyzing the ring closure mixture which is present after cyclization at a temperature of at least 110° C., preferably from 110 to 180° C. and, with particular preference, 135 to 165° C. using water or dilute phosphoric acid under pressure and then isolating the mixed crystal pigment, directly or following a fine division step and/or a finish treatment.

As the ring closure agent use is generally made of some 3 to 10 times, preferably from 3 to 5 times, the amount of polyphosphoric acid or its methyl ester, based on the dianilinoterephthalic acid. The $P_2O_5$ content of the polyphosphoric acid or ester is between 80 and 85% by weight, preferably between 83 and 85% by weight, corresponding to a phosphoric acid equivalent of from 110 to 120%. Larger amounts of ring closure agent can be used but are generally unnecessary. The ring closure temperature is generally from 80 to 150° C., preferably from 120 to 140° C. In the ring closure reaction it is also possible for inert solvents, such as aromatic hydrocarbons, to be present.

The time taken to complete cyclization is in general from 0.5 to 24 hours, but usually from only 1 to 2 hours.

The ring closure mixtures which are present after the cyclization are hydrolyzed at a temperature of at least 110° C. using water or dilute phosphoric acid, alone or in the presence of an organic solvent that is inert under the reaction conditions, such as an aromatic hydrocarbon, and under pressure. Water or dilute phosphoric acid is used for the hydrolysis. In this case the ring closure mixture is metered under pressure into the water or the dilute phosphoric acid. Alternatively, the converse procedure can be adopted. The high-temperature hydrolysis of the invention can be conducted continuously or batchwise. Advantageously, it is conducted continuously in a static mixer. Based on the polyphosphoric acid, from 2 to 10 times the amount of water or dilute phosphoric acid are generally employed. The duration of hydrolysis depends on the metering rate of the ring closure melt and is, for example, from 0.5 to 24 hours, preferably from 0.5 to 5 hours.

By virtue of the inventive choice of the dianilinoterephthalic acids, the ring closure conditions and the high temperature hydrolysis conditions, functional mixed crystal pigments which can be isolated by customary methods are obtained directly after the high-temperature hydrolysis. For certain end uses it may be advantageous to subject the resulting finely divided mixed crystals (in this case referred to as prepigments) to a finishing treatment at elevated temperatures, or first of all coarsely crystalline mixed crystal crude pigments are obtained, which for certain applications are advantageously subjected to mechanical fine division and, directly or following a finishing treatment, are converted to a functional pigment form.

The mixed crystal prepigments are subjected, with or without isolation beforehand, to an aftertreatment with or without the addition of solvents at a temperature of from 50 to 200° C. and, following the separation of the liquid medium, are isolated. The liquid medium can preferably have an alkaline pH, e.g. from 7.5 to 13. The coarsely crystalline mixed crystal crude pigments are subjected to mechanical fine division and then the resulting mixed crystal pigments are isolated in the customary manner or are subjected, with or without isolation beforehand, to a finishing treatment, as described above, and following the separation of the liquid medium are isolated. Fine division can be brought about by dry or wet grinding. Preference is given to wet grinding with high energy input, since for this purpose it is not necessary to dry the mixed crystal crude pigment.

Dry grinding is suitably conducted using all batchwise or continuous vibrating mills or roll mills, and wet grinding using all batchwise or continuous stirred ball mills, roll mills and vibrating mills and also kneading apparatus. For wet grinding, the mixed crystal crude pigment suspensions directly—or, following isolation beforehand, the moist presscakes or the dried, coarsely crystalline mixed crystal crude pigments—are diluted to a millable consistency with water, dilute sodium hydroxide solution and/or a preferably water-miscible solvent. The grinding media used are beads of zirconium oxide, zirconium mixed oxide, aluminum oxide, steel or quartz with a diameter of from 0.2 to 20 mm. The duration of grinding is judicially between 5 and 60 minutes, preferably between 7.5 and 30 minutes.

The mixed crystal prepigments which are present following high-temperature hydrolysis or fine division can be subjected to a finishing treatment in aqueous suspension, directly or following the addition of solvents, or in an organic medium. The conditions to be observed for conducting the finishing treatment are to a high degree dependent on the desired properties of the mixed crystal pigments and are directed in each case toward that aim. Normally, the suspension of the mixed crystal prepigments in the relevant medium is treated at a temperature in the range between 50 and 200° C., at atmospheric or elevated pressure, for from 1 to 24 hours, preferably at from 50 to 150° C. for from 1 to 6 hours. In general, the suspension obtained after wet grinding is employed for this purpose, without isolation of the millbase beforehand. The amount of solvent added here can vary within wide limits. It is preferred to use from the same up to 5 times the amount by weight of solvent, based on the weight of the mixed crystal prepigments. After the end of finishing, the solvents used for that purpose can be recovered by distillation and used again. Utilizing the variants available in this way it is possible, depending on the end use, to convert the mixed crystal prepigments obtained by the process of the invention into a higher-hiding or more transparent form, which can be controlled via the solvency of the relevant solvent, its concentration, the chosen temperature and the duration of the finishing treatment.

In order to improve the color properties and to obtain particular color effects it is possible at any point in the process to add solvents, pigment dispersants, surfactants, defoamers, extenders or other additives. It is also possible to use mixtures of these additives. The additives can be added all at once or in two or more portions. The addition can be made before, during or after ring closure, during high-temperature hydrolysis, during grinding or during the finishing treatment, or during or after isolation. The most suitable point in time must be determined beforehand by guideline experiments.

Examples of surfactants which are employed in the process are cationic, anionic or nonionic surfactants, preferably fatty acid taurides, fatty acid sarcosides, fatty alcohol polyglycol ethers, fatty alcohol polyglycol esters, alkyl polyglycol ether sulfates, alkylphenol polyglycol ethers, alkanesulfonic acids and their salts, alkylphenylsulfonic acids and their salts, and alkylphenol polyglycol ether sulfates.

Pigment dispersants employed in the course of the process are compounds having the formula(II)

$$P-X_m \quad (II)$$

in which

P is an m-valent radical of a linear quinacridone of the formula (I) in which $R^1$ and $R^2$ are identical and are hydrogen atoms or methyl groups, X is a group of the formula (III)

$$-COOM \quad (III)$$

or a group of the formula (IV)

$$SO_3M \quad (IV)$$

in which

M is the hydrogen ion $H^+$ or the equivalent $M^{r+}/r$ of an r-valent metal cation, where r is in each case at each occurrence one of the numbers 1, 2 and 3, examples being $Li^{1+}$, $Na^{1+}$, $K^{1+}$, $Mg^{2+}$, $Ca^{2+}$, $Sr^{2+}$, $Ba^{2+}$, $Mn^{2+}$, $Cu^{2+}$, $Ni^{2+}$, $Cd^{2+}$, $Co^{2+}$, $Zn^{2+}$, $Fe^{2+}$, $Al^{3+}$, $Cr^{3+}$ or $Fe^{3+}$; or an ammonium ion having the structure $N^+R^3R^4R^5R^6$, where the substituents $R^3$, $R^4$, $R^5$ and $R^6$ on the quaternary nitrogen atom are each individually and independently of one another hydrogen atoms or $C_1$–$C_{30}$-alkyl, $C_2$–$C_{30}$-alkenyl or $C_5$–$C_{30}$-cycloalkyl groups, which can be substituted by hydroxyl, di- ($C_1$–$C_4$-alkyl)amino, carboxyl or carboxamide groups, and m is a number between 1 and 4, or

X is a group of the formula (V)

(V)

in which $R^8$ and $R^9$ independently of one another are each a hydrogen atom, a $C_1$–$C_{20}$-alkyl or $C_2$–$C_{20}$-alkenyl group or a $C_5$–$C_7$-cycloalkyl group, or in which $R^8$ and $R^9$, together with the adjacent nitrogen atom, form an aliphatic or aromatic, five- or six-membered heterocyclic ring system having in each case from 1 to 3 identical or different ring-member heteroatoms from the series consisting of nitrogen, oxygen or sulfur, $R^7$ is a hydrogen atom or a $C_1$–$C_4$-alkyl group, n is a number from 1 to 6, o is the number 0 or 1, and m is a number from 1 to 4, or X is a group of the formula (VI)

(VI)

in which $R^{10}$, $R^{12}$ and $R^{13}$ are each a hydrogen, fluorine, chlorine or bromine atom and $R^{11}$ is a hydrogen, fluorine, chlorine or bromine atom or is a nitro, $C_1$–$C_5$-alkyl, $C_1$–$C_6$-alkoxy or benzoylamino group, and m is a number from 1 to 4.

Preference is given to pigment dispersants having the formula (II) in which P is the radical of unsubstituted linear quinacridone and X is the phthalimidomethylene group or the sulfonamido group. Per weight unit of mixed crystal crude pigment, prepigment or pigment it is judiciously possible to add in total between 0.1 and 20% by weight, preferably from 3 to 10% by weight, of surfactants and/or pigment dispersants.

Examples of organic solvents which can be employed in one or more steps of the process of the invention are alicyclic hydrocarbons, such as cyclohexane; $C_1$–$C_8$-alkanols and alicyclic alcohols, such as methanol, ethanol, n- or isopropanol, n- or isobutanol, tert-butanol, pentanols, hexanols, cyclohexanol; $C_1$–$C_5$-dialkyl ketones or cyclic ketones, such as acetone, diethyl ketone, methyl isobutyl ketone, methyl ethyl ketone or cyclohexanone; ethers and glycol ethers, such as the monomethyl or monoethyl ether of ethylene and propylene glycol, butylglycol, ethyldiglycol or methoxybutanol; aromatic hydrocarbons, such as toluene, xylenes or ethylbenzene, cyclic ethers, such as tetrahydrofuran, chlorinated aromatic hydrocarbons, such as chlorobenzene, o-dichlorobenzene, or 1,2,4-trichlorobenzene, or bromobenzene; substituted aromatic compounds, such as benzoic acid, nitrobenzene or phenol; aliphatic carboxamides, such as formamide or dimethylformamide; cyclic carboxamides, such as N-methylpyrrolidone; $C_1$–$C_4$-alkyl carboxylates, such as butyl formate, ethyl acetate or propyl propionate; carboxylic acid $C_1$–$C_4$-glycol esters, $C_1$–$C_4$-alkyl phthalates and $C_1$–$C_4$-alkyl benzoates, such as ethyl benzoate; heterocyclic bases, such as pyridine, quinoline, morpholine or picoline; and also dimethyl sulfoxide and sulfolane. Preferred organic solvents are alkanols, especially ethanol, propanols, butanols and pentanols; aliphatic carboxamides, especially formamide or dimethylformamide; cyclic carboxamides, especially N-methylpyrrolidone; aromatic hydrocarbons, such as toluene, xylenes or ethylbenzene; and chlorinated aromatic hydrocarbons, such as chlorobenzene or o-dichlorobenzene.

It was surprising and not foreseeable that the high-temperature hydrolysis produces pure mixed crystal pigments whereas according to the information in U.S. Pat. No. 3,160,510 quinacridone mixed crystal pigments (rather than mixtures) are formed only when the unsubstituted quinacridone is present in a much lower proportion than is the case in the present invention. In addition, according to the information in U.S. Pat. No. 4,099,980, the solvolysis of ring closure mixtures having the above composition produces mixed crystal pigments in the γ phase of unsubstituted quinacridone, whereas the process of the invention produces mixed crystal pigments which are in the β phase.

The preparation of mixed crystal pigments by the process of the invention has been found to be particularly economic and environment-friendly since in the high-temperature hydrolysis the hydrolysis products can be obtained directly as mixed crystal pigments. These pigments possess coloristic properties which cannot be achieved with the pigments prepared at low hydrolysis temperature; for example, a bluish red.

With the process of the invention it is possible to manage with small amounts of chemicals and solvents which can subsequently be processed further or completely regenerated again. Consequently, no disposal problems arise.

The mixed crystal pigments obtainable by the present invention are notable for their outstanding coloristic and rheological properties, and especially for their high flocculation stability, ease of dispersibility, good luster characteristics and high color strength.

The mixed crystal pigments of the invention can be used to pigment high molecular mass organic materials of natural or synthetic origin. Examples of high molecular mass organic materials are cellulose ethers and cellulose esters, such as ethylcellulose, nitrocellulose, cellulose acetate or cellulose butyrate, natural resins or synthetic resins, such as addition polymerization resins or condensation resins, examples being amino resins, especially urea- and melamine-formaldehyde resins, alkyd resins, acrylic resins, phenolic resins, polycarbonates, polyolefins, such as polyethylene or polypropylene, polystyrene, polyvinyl chloride, polyacrylonitrile, polyacrylates, polyamides, polyurethanes or polyesters, rubber, casein, silicone and silicone resins, individually or in mixtures.

In this context it is irrelevant whether the high molecular organic compounds referred to are in the form of plastic masses or melts or in the form of spinning solutions, varnishes, paints or printing inks. Depending on the intended use it is found advantageous to utilize the mixed crystal pigments of the invention as blends or in the form of preparations or dispersions. Based on the high molecular mass organic material to be pigmented, the mixed crystal pigments of the invention are employed in an amount of preferably from 0.1 to 10%.

To evaluate the properties of the mixed crystal pigments prepared by the invention in the coatings sector, a selection was made, from the large number of known coating materials, of an alkyd-melamine resin varnish (AM) which contained aromatic compounds and was based on a medium-oil alkyd resin and on a butanol-etherified melamine resin, a polyester varnish (PE) based on cellulose acetobutyrate and on a melamine resin, and an aqueous, polyurethane-based varnish (PU).

To evaluate the properties of the mixed crystal pigments produced by the invention in the plastics sector, a selection was made from the large number of known plastics of flexible polyvinyl chloride (PVC) and polyolefin (PO).

To evaluate the properties of the mixed crystal pigments produced by the invention in the printing sector a selection was made, from the large number of known printing systems, of an intaglio printing system based on nitrocellulose (NC print).

The color strength and hue were determined in accordance with DIN 55986. The rheology of the millbase following dispersion was evaluated using the following five-point scale:

| | |
|---|---|
| 5 | mobile |
| 4 | liquid |
| 3 | viscous |
| 2 | slightly set |
| 1 | fully set |

Following the dilution of the millbase to the pigment end concentration, the viscosity was measured with the Rossmann Viscospatula, type 301, from Erichsen.

Gloss measurements were made on samples cast out onto films, at an angle of 20° in accordance with DIN 67530 (ASTMD 523) using the "multigloss" gloss meter from Byk-Mallinckrodt.

The determination of the crystal phase of the mixed crystal crude pigments, mixed crystal prepigments, mixed crystal pigments and pigment preparations was carried out by X-ray spectroscopy.

In the preceding text and in the examples below, parts and percentages are in each case based on the weight of the substances so described.

EXAMPLE 1

Figure 1:
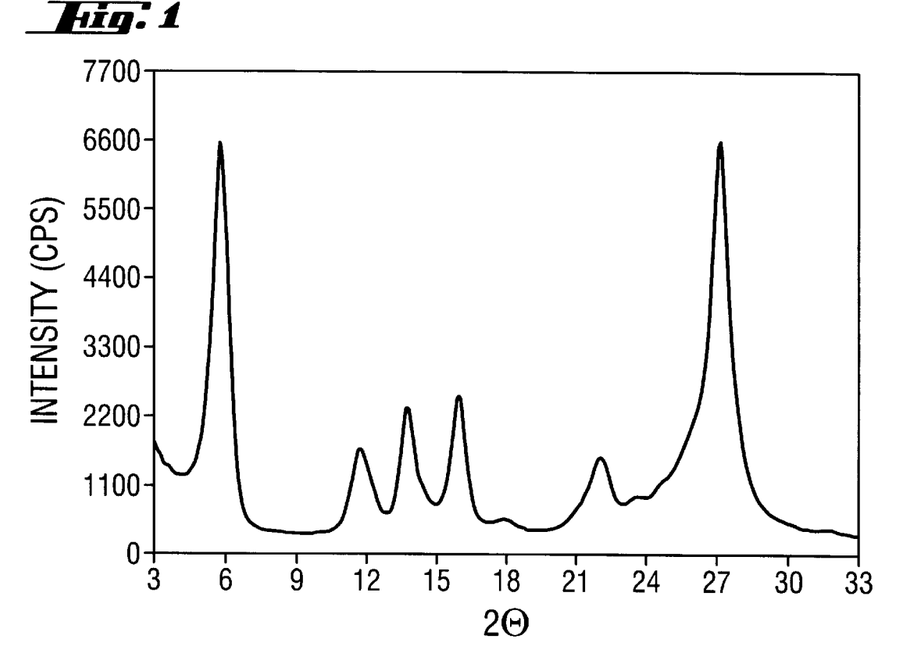
FIG. 1: Quinacridone mixed crystal according to Example 1.

392 parts of polyphosphoric acid, containing 85.0% $P_2O_5$, are introduced into a pressure vessel. Then 70.5 parts of 2,5-dianilinoterephthalic acid and 7.8 parts of 2,5-di(4-toluidino)terephthalic acid are introduced with stirring at from 80 to 90° C. and the mixture is heated at 125° C. for 1 hour during which ring closure takes place to form the quinacridone. The reaction mixture is then introduced into a second pressure vessel where it is hydrolyzed under pressure and with stirring with a mixture of 1762 parts of 30% phosphoric acid at 140° C. During this hydrolysis the temperature rises to 155° C. The mixture is stirred at 155° C. for 0.5 hour. Then it is cooled to 60° C. and the mixed crystal pigment is filtered off with suction, washed to neutrality with water and dried at 80° C. This gives 70.2 parts of mixed crystal pigment. The spectrum is that of the mixed crystal pigment (FIG. 1). This spectrum differs from the spectrum of unsubstituted β-phase quinacridone by an additional reflection at 13.73° (2θ). The typical reflections of 2,9-dimethylquinacridone at 11.05 and 25.31° (2θ) (FIG. 6) cannot be detected. Table 1 reproduces the X-ray diffraction spectra of FIGS. 1 and 6 in digital form.

In the AM varnish, transparent coatings of high color strength and very pure hue are obtained. The rheology is measured as 5 and the viscosity is 3.9 s. In the PUR varnish, transparent coatings of high color strength and pure hue with a reddish shade are obtained.

EXAMPLE 2(COMPARATIVE EXAMPLE)

Figure 2:
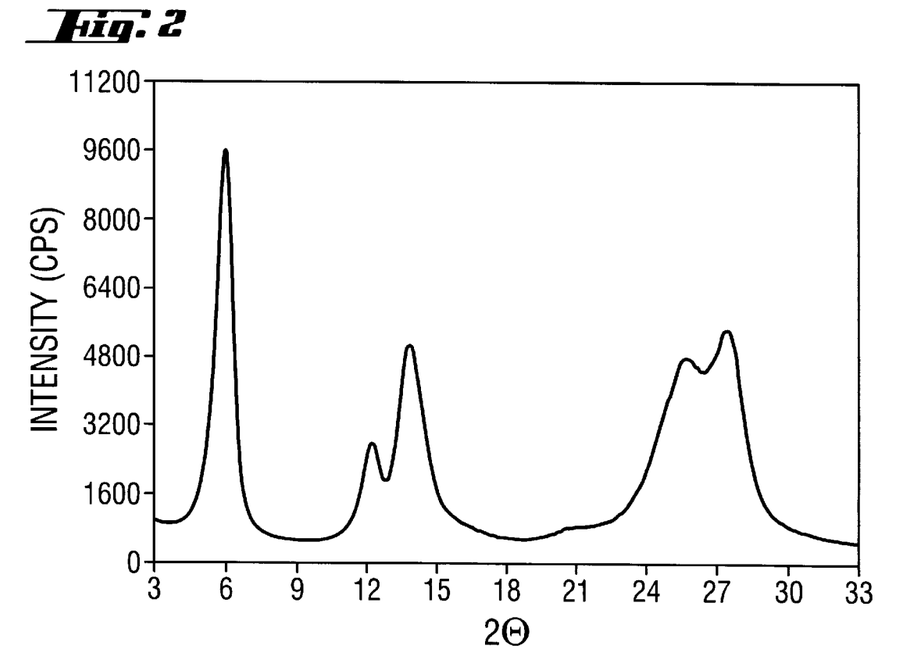
FIG. 2: Unsubstituted quinacridone, alpha-phase, according to Example 2 (Comparative)

383 parts of polyphosphoric acid, containing 85.0% $P_2O_5$, are introduced into a stirred vessel. Then 69.0 parts of 2,5-dianilinoterephthalic acid and 7.66 parts of 2,5-di(4-toluidino)terephthalic acid are introduced with stirring at from 80 to 90° C. and the mixture is heated at 125° C. for 1 hour during which ring closure takes place to form the quinacridone. The reaction mixture is then introduced into a second stirred vessel where it is hydrolyzed with stirring with a mixture of 1725 parts of 30% phosphoric acid at 55° C. During this hydrolysis the temperature rises to 67° C. The mixture is stirred at 67° C. for 0.5 hour. Then it is cooled to 60° C. and the pigment is filtered off with suction, washed to neutrality with water and dried at 80° C. This gives 68.7 parts of pigment which is in the α-phase of unsubstituted quinacridone (FIG. 2). Table 1 reproduces the X-ray diffraction spectrum of FIG. 2 in digital form.

EXAMPLE 3(COMPARATIVE EXAMPLE)

383 parts of polyphosphoric acid, containing 85.0% $P_2O_5$, are introduced into a stirred vessel. Then 69.0 parts of 2,5-dianilinoterephthalic acid and 7.66 parts of 2,5-di(4-toluidino)terephthalic acid are introduced with stirring at from 80 to 90° C. and the mixture is heated at 125° C. for 1 hour during which ring closure takes place to form the quinacridone. The reaction mixture is then introduced into a second stirred vessel where it is hydrolyzed with stirring with a mixture of 1725 parts of 30% phosphoric acid at 55° C. During this hydrolysis the temperature rises to 67° C. The mixture is stirred at 67° C. for 0.5 hour. Then it is cooled to 60° C. and the pigment is filtered off with suction and washed to neutrality with water.

This gives 452 parts of a 15.2% pure prepigment presscake. For the finishing operation, 384.2 parts of this prepigment presscake are introduced into a stirred vessel. Then 540.2 parts of water, 6.0 parts of 98% sodium hydroxide and 175 parts of isobutanol are added. The mixture is heated under pressure to 150° C. and is stirred at this temperature for 5 hours. Then it is cooled to 90° C. and the isobutanol is distilled off at up to 100° C. at the bridge. Subsequently, the suspension is cooled to 60° C. and the pigment is filtered off with suction, washed to neutrality with water and dried at 80° C.

This gives 56.9 parts of pigment. The spectrum is that of the α-phase of unsubstituted quinacridone with a few extraneous reflections (FIG. 2).

EXAMPLE 4(COMPARATIVE EXAMPLE)

424 parts of polyphosphoric acid, containing 85.0% $P_2O_5$, are introduced into a pressure vessel. Then 84.7 parts of 2,5-dianilinoterephthalic acid are introduced with stirring at from 80 to 90° C. and the mixture is heated at 125° C. for 1 hour during which ring closure takes place to form the quinacridone. The reaction mixture is then introduced into a second pressure vessel where it is hydrolyzed under pressure and with stirring with 1906 parts of 30.9% phosphoric acid at 140° C. During this hydrolysis the temperature rises to 155° C. The mixture is stirred at 155° C. for 0.5 hour. Then it is cooled to 60° C. and the pigment is filtered off with suction, washed to neutrality with water and dried at 80° C.

Figure 3:
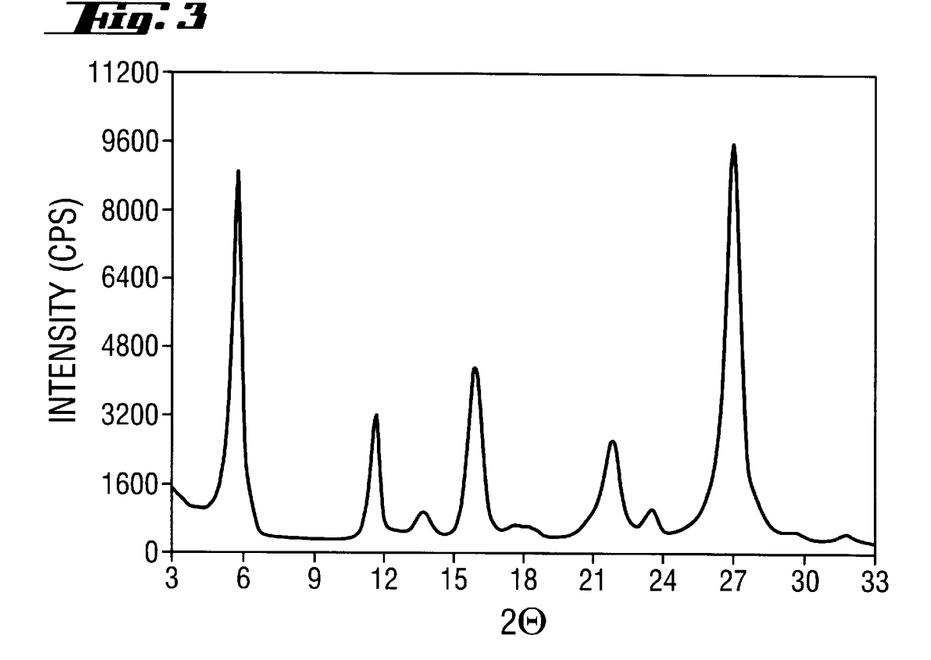
FIG. 3: Unsubstituted quinacridone, beta-phase, according to Example 4 (Comparative)

This gives 76.0 parts of pigment (C. I. Pigment Violet 19). The spectrum is that of the β-phase of unsubstituted quinacridone (FIG. 3). Table 1 reproduces the X-ray diffraction spectrum of FIG. 3 in digital form. In the AM varnish, opaque coatings are obtained which are markedly more bluish and more cloudy than those with the mixed crystal pigment prepared in accordance with Example 1.

EXAMPLE 5(COMPARATIVE EXAMPLE)

Figure 4:
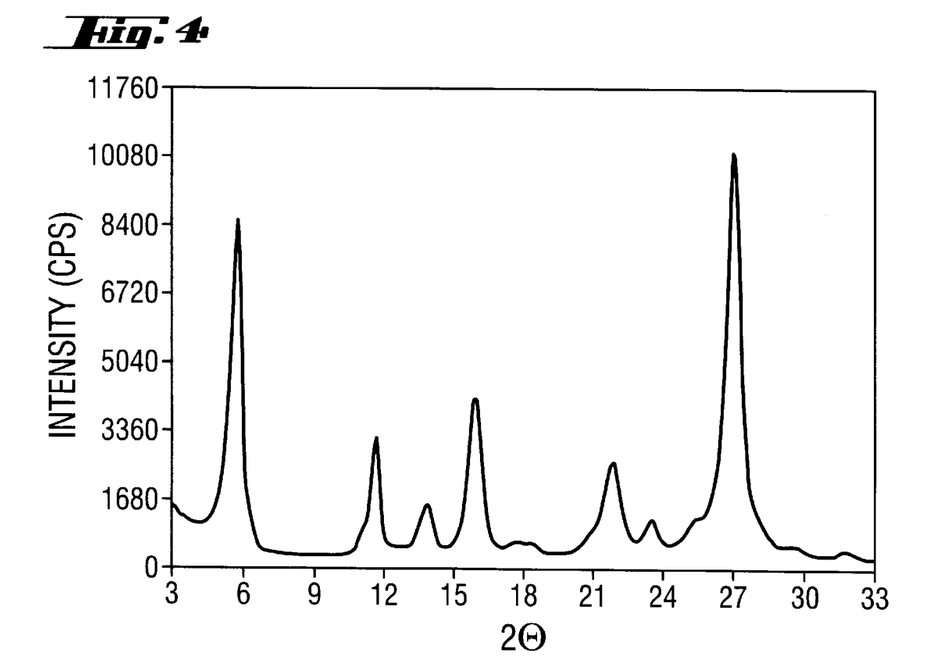
FIG. 4: Mechanical mixture of unsubstituted quinacridone, beta-phase (9 parts) and 2,9-dimethylquinacridone (1 part) (Comparative)

9 parts of pigment prepared in accordance with Example 4 and 1 part of 2,9-dimethylquinacridone pigment prepared by ring closure of 2,5-di(4-toluidino)terephthalic acid and subsequent hot hydrolysis in accordance with Example 4 are mixed mechanically. In the X-ray spectrum, all of the characteristic peaks of the two components can be seen (FIG. 4). Table 1 reproduces the X-ray diffraction spectrum of FIG. 4 in digital form.

In the AM varnish, opaque coatings are obtained which are markedly more bluish and more cloudy than those with the mixed crystal pigment prepared in accordance with Example 1.

EXAMPLE 6

387 parts of polyphosphoric acid, containing 85.0% $P_2O_5$, are introduced into a pressure vessel. Then 73.5 parts of 2,5-dianilinoterephthalic acid and 3.9 parts of 2,5-di(4-toluidino)terephthalic acid are introduced with stirring at from 80 to 90° C. and the mixture is heated at 125° C. for 1 hour during which ring closure takes place to form the quinacridone. The reaction mixture is then introduced into a second pressure vessel where it is hydrolyzed under pressure and with stirring with a mixture of 1741 parts of 30% phosphoric acid at 140° C. During this hydrolysis the temperature rises to 155° C. The mixture is stirred at 155° C. for 0.5 hour. Then it is cooled to 60° C. and the mixed crystal pigment is filtered off with suction, washed to neutrality with water and dried at 80° C.

This gives 69.4 parts of mixed crystal pigment. The spectrum is that of the mixed crystal pigment (FIG. 1). In the AM varnish, transparent coatings with high color strength and a very pure hue are obtained. The rheology is measured as 5 and the viscosity is 3.9 s.

EXAMPLE 7

382 parts of polyphosphoric acid, containing 85.0% $P_2O_5$, are introduced into a pressure vessel. Then 64.9 parts of 2,5-dianilinoterephthalic acid and 11.5 parts of 2,5-di(4-toluidino)terephthalic acid are introduced with stirring at from 80 to 90° C. and the mixture is heated at 125° C. for 1 hour during which ring closure takes place to form the quinacridone. The reaction mixture is then introduced into a second pressure vessel where it is hydrolyzed under pressure and with stirring with a mixture of 1721 parts of 30% phosphoric acid at 140° C. During this hydrolysis the temperature rises to 155° C. The mixture is stirred at 155° C. for 0.5 hour. Then it is cooled to 60° C. and the mixed crystal pigment is filtered off with suction, washed to neutrality with water and dried at 80° C.

This gives 68.6 parts of mixed crystal pigment. The spectrum is that of the mixed crystal pigment (FIG. 1). The typical reflections of 2,9-dimethylquinacridone cannot be detected. In the corresponding mechanical mixture, the characteristic peaks of 2,9-dimethylquinacridone can be seen. In the AM varnish, transparent coatings of high color strength and a very pure and very reddish hue are obtained. The rheology is measured as 5 and the viscosity is 3.9 s. Strongly colored prints are obtained in the NC print.

EXAMPLE 8

380 parts of polyphosphoric acid, containing 85.0% $P_2O_5$, are introduced into a pressure vessel. Then 66.5 parts of 2,5-dianilinoterephthalic acid and 9.5 parts of 2,5-di(4-toluidino)terephthalic acid are introduced with stirring at from 80 to 90° C. and the mixture is heated at 125° C. for 1 hour during which ring closure takes place to form the quinacridone. The reaction mixture is then introduced into a second pressure vessel where it is hydrolyzed under pressure and with stirring with a mixture of 1711 parts of 30% phosphoric acid at 140° C. During this hydrolysis the temperature rises to 155° C. The mixture is stirred at 155° C. for 0.5 hour. Then it is cooled to 60° C. and the mixed crystal pigment is filtered off with suction, washed to neutrality with water and dried at 80° C.

This gives 68.2 parts of mixed crystal pigment. The spectrum is that of the mixed crystal pigment (FIG. 1). In the corresponding mechanical mixture, the characteristic peaks of 2,9-dimethylquinacridone can be seen. In the AM varnish, transparent coatings of high color strength with a very pure and very reddish hue are obtained. The rheology is measured as 4–5 and the viscosity is 4.1 s.

EXAMPLE 9(COMPARATIVE EXAMPLE: Ratio 80:20)

373 parts of polyphosphoric acid, containing 85.0% $P_2O_5$, are introduced into a pressure vessel. Then 59.7 parts of 2,5-dianilinoterephthalic acid and 14.9 parts of 2,5-di(4-toluidino)terephthalic acid are introduced with stirring at from 80 to 90° C. and the mixture is heated at 125° C. for 1 hour during which ring closure takes place to form the quinacridone. The reaction mixture is subsequently introduced into a second pressure vessel where it is hydrolyzed under pressure and with stirring with a mixture of 1679 parts of 30% phosphoric acid at 140° C. During this hydrolysis the temperature rises to 155° C. The mixture is stirred at 155° C. for 0.5 hour. Then it is cooled to 60° C. and the mixed crystal pigment is filtered off with suction, washed to neutrality with water and dried at 80° C.

Figure 5:
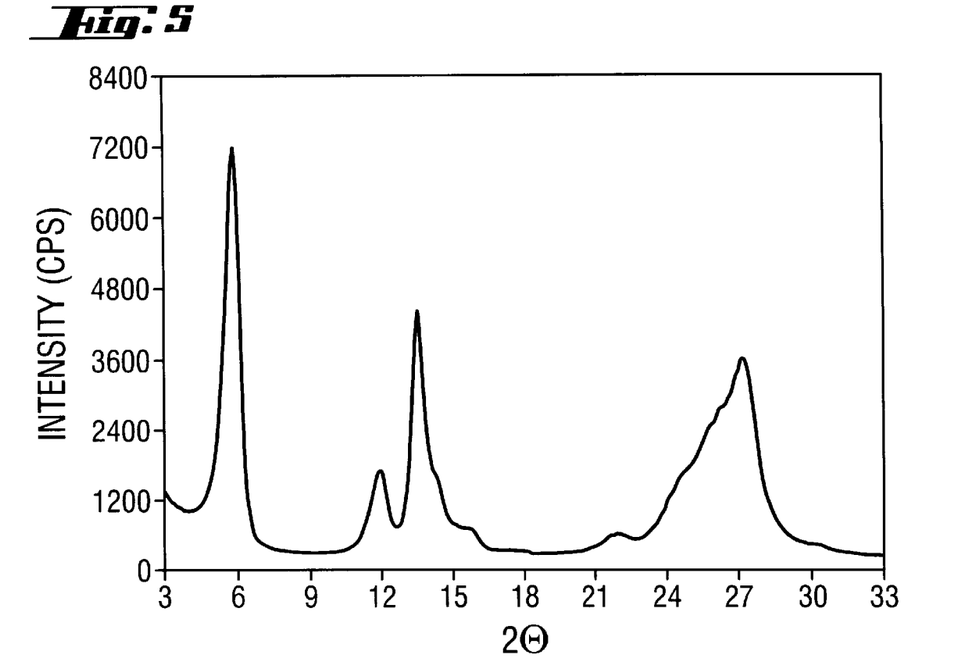
FIG. 5: Mixed crystal 80:20 according to Example 9 (Comparative)

This gives 67.0 parts of pigment. The spectrum is very similar to that of 2,9-dimethylquinacridone (FIG. 5). The characteristic peaks, however, have undergone a very great shift. Table 1 reproduces the X-ray diffraction spectrum of FIG. 5 in digital form.

EXAMPLE 10

380 parts of polyphosphoric acid, containing 85.0% $P_2O_5$, are introduced into a pressure vessel. Then 68.5 parts of 2,5-dianilinoterephthalic acid and 7.6 parts of 2,5-di(2-chloro-anilino)terephthalic acid are introduced with stirring at from 80 to 90° C. and the mixture is heated at 125° C. for 1 hour during which ring closure takes place to form the quinacridone. The reaction mixture is then introduced into a second pressure vessel where it is hydrolyzed under pressure and with stirring with a mixture of 1711 parts of 30% phosphoric acid at 140° C. During this hydrolysis the temperature rises to 155° C. The mixture is stirred at 155° C. for 0.5 hour. Then it is cooled to 60° C. and the mixed crystal pigment is filtered off with suction, washed to neutrality with water and dried at 80° C.

This gives 68.3 parts of mixed crystal pigment. The spectrum is that of the mixed crystal pigment (FIG. 1). In the AM varnish, transparent coatings of high color strength with a very pure hue are obtained. The rheology is measured as 5 and the viscosity is 3.9 s.

EXAMPLE 11

380 parts of polyphosphoric acid, containing 85.0% $P_2O_5$, are introduced into a pressure vessel. Then 68.5 parts of 2,5-dianilinoterephthalic acid and 7.6 parts of 2,5-di(3-chloro-4-methylanilino)terephthalic acid are introduced with stirring at from 80 to 90° C. and the mixture is heated at 125° C. for 1 hour during which ring closure takes place to form the quinacridone. The reaction mixture is then introduced into a second pressure vessel where it is hydrolyzed under pressure and with stirring with a mixture of 1712 parts of 30% phosphoric acid at 140° C. During this hydrolysis the temperature rises to 155° C. The mixture is stirred at 155° C. for 0.5 hour. Then it is cooled to 60° C. and the mixed crystal pigment is filtered off with suction, washed to neutrality with water and dried at 80° C.

This gives 68.4 parts of mixed crystal pigment. The spectrum is that of the mixed crystal pigment (FIG. 1). In the AM varnish, coatings of high color strength with a very pure hue are obtained. The rheology is measured as 5 and the viscosity is 3.7 s.

EXAMPLE 12

385 parts of polyphosphoric acid, containing 85.0% $P_2O_5$, are introduced into a pressure vessel. Then 69.3 parts of 2,5-dianilinoterephthalic acid and 7.7 parts of 2,5-di(3-chloro-anilino)terephthalic acid are introduced with stirring at from 80 to 90° C. and the mixture is heated at 125° C. for 1 hour during which ring closure takes place to form the quinacridone. The reaction mixture is then introduced into a second pressure vessel where it is hydrolyzed under pressure and with stirring with a mixture of 1733 parts of water at 140° C. During this hydrolysis the temperature rises to 160° C. The mixture is stirred at 160° C. for 0.5 hour. Then it is cooled to 60° C. and the mixed crystal pigment is filtered off with suction, washed to neutrality with water and dried at 80° C.

This gives 69.2 parts of mixed crystal pigment. The spectrum is that of the mixed crystal pigment (FIG. 1). In the AM varnish, coatings of high color strength with a pure hue are obtained. The rheology is measured as 5 and the viscosity is 4.2 s.

EXAMPLE 13

382 parts of polyphosphoric acid, containing 85.0% $P_2O_5$, are introduced into a pressure vessel. Then 68.7 parts of 2,5-dianilinoterephthalic acid and 7.6 parts of 2,5-di(4-chloro-anilino)terephthalic acid are introduced with stirring at from 80 to 90° C. and the mixture is heated at 125° C. for 1 hour during which ring closure takes place to form the quinacridone. The reaction mixture is then introduced into a second pressure vessel where it is hydrolyzed under pressure and with stirring with a mixture of 1718 parts of 30% phosphoric acid at 140° C. During this hydrolysis the temperature rises to 155° C. The mixture is stirred at 155° C. for 0.5 hour. Then it is cooled to 60° C. and the mixed crystal pigment is filtered off with suction, washed to neutrality with water and dried at 80° C.

This gives 69.2 parts of mixed crystal pigment. The spectrum is that of the mixed crystal pigment (FIG. 1). In the AM varnish, transparent coatings of high color strength with a very pure hue are obtained. The rheology is measured as 5 and the viscosity is 4.4 s.

EXAMPLE 14

298 parts of polyphosphoric acid, containing 85.0% $P_2O_5$, are introduced into a pressure vessel. Then 53.7 parts of 2,5-dianilinoterephthalic acid and 6.0 parts of 2,5-di(4-N-methylcarboxamido-anilino)terephthalic acid are introduced with stirring at from 80 to 90° C. and the mixture is heated at 125° C. for 1 hour during which ring closure takes place to form the quinacridone. The reaction mixture is then introduced into a second pressure vessel where it is hydrolyzed under pressure and with stirring with a mixture of 1342 parts of water and 53 parts of xylene at 140° C. During this hydrolysis the temperature rises to 155° C. The mixture is stirred at 155° C. for 0.5 hour. Then it is cooled to 90° C. and the xylene is distilled off with steam. The mixture is subsequently cooled to 60° C. and the mixed crystal pigment is filtered off with suction, washed to neutrality with water and dried at 80° C.

This gives 53.6 parts of mixed crystal pigment. The spectrum resembles that of the β-phase (FIG. 3). In the AM varnish, coatings of high color strength are obtained. The rheology is measured as 5 and the viscosity is 3.8 s.

EXAMPLE 15

465 parts of polyphosphoric acid, containing 85.0% $P_2O_5$, are introduced into a pressure vessel. Then 83.8 parts of 2,5-dianilinoterephthalic acid, 4.6 parts of 2,5-di(3-toluidino)terephthalic acid and 4.6 parts of 2,5-di(3-chloro-anilino)terephthalic acid are introduced with stirring at from 80 to 90° C. and the mixture is heated at 125° C. for 1 hour during which ring closure takes place to form the quinacridone. The reaction mixture is then introduced into a second pressure vessel where it is hydrolyzed under pressure and with stirring with a mixture of 2095 parts of 30% phosphoric acid at 140° C. During this hydrolysis the temperature rises to 155° C. The mixture is stirred at 155° C. for 0.5 hour. Then it is cooled to 60° C. and the mixed crystal pigment is filtered off with suction, washed to neutrality with water and dried at 80° C.

This gives 83.6 parts of mixed crystal pigment. The spectrum is that of the mixed crystal pigment (FIG. 1). In the AM varnish, coatings of high color strength with a pure hue are obtained. The rheology is measured as 5 and the viscosity is 3.6 s.

EXAMPLE 16

392 parts of polyphosphoric acid, containing 85.0% $P_2O_5$, are introduced into a pressure vessel. Then 70.5 parts of 2,5-dianilinoterephthalic acid and 7.8 parts of 2,5-di(4-toluidino)terephthalic acid are introduced with stirring at from 80 to 90° C. and the mixture is heated at 125° C. for 1 hour during which ring closure takes place to form the quinacridone. The reaction mixture is then introduced into a second pressure vessel where it is hydrolyzed under pressure and with stirring with a mixture of 1762 parts of 30% phosphoric acid at 140° C. During this hydrolysis the temperature rises to 155° C. The mixture is stirred at 155° C. for 0.5 hour. Then it is cooled to 60° C. and the mixed crystal prepigment is filtered off with suction and washed to neutrality with water.

This gives 354.6 parts of 19.8% pure mixed crystal prepigment presscake. For the finishing operation, 166.2 parts thereof are introduced into and stirred up with a solution of 306 parts of water and 13.7 parts of 33% sodium hydroxide solution. Then 1.73 parts of pigment dispersant of the formula (II) are added. In this formula (II) P is the radical of linear unsubstituted quinacridone and X is the sulfonamido group (V) in which $R^1$ is a hydrogen atom, $R^2$ and $R^3$ are each an ethyl group, n is the number 3.0, o is the number 1.0 and m is the number 2.0. The mixture is heated to boiling temperature and stirred at that temperature for 5 hours. Then it is cooled to 60° C. and the pigment preparation is filtered off with suction, washed to neutrality with water and dried at 80° C.

This gives 34.9 parts of pigment preparation. The spectrum is that of the mixed crystal pigment (FIG. 1). In the AM varnish, coatings of high color strength and very pure hue are obtained. The rheology is measured as 5. The viscosity is 4.0 s and the gloss measurement gives the value 88. In the PE varnish and in the PE metallic finish, coatings of high color strength are obtained. The weather fastness is very good.

EXAMPLE 17

382 parts of polyphosphoric acid, containing 85.0% $P_2O_5$, are introduced into a pressure vessel. Then 68.8 parts of 2,5-dianilinoterephthalic acid and 7.6 parts of 2,5-di(4-toluidino)terephthalic acid are introduced with stirring at from 80 to 90° C. and the mixture is heated at 125° C. for 1 hour during which ring closure takes place to form the quinacridone. The reaction mixture is then introduced into a second pressure vessel where it is hydrolyzed under pressure and with stirring with a mixture of 1719 parts of 30% phosphoric acid at 140° C. During this hydrolysis the temperature rises to 155° C. The mixture is stirred at 155° C. for 0.5 hour. Then it is cooled to 60° C. and the mixed crystal prepigment is filtered off with suction and washed to neutrality with water.

This gives 340.4 parts of 17.2% pure mixed crystal prepigment presscake. For the finishing operation, this presscake is introduced into a stirred vessel. Then 584 parts of water, 6.0 parts of 98% sodium hydroxide and 175 parts of 100% isobutanol are added. The mixture is heated under pressure to 150° C. and stirred at this temperature for 5 hours. Then it is cooled to 90° C. and the isobutanol is distilled off at up to 100° C at the bridge. The mixture is subsequently cooled to 60° C. and the mixed crystal pigment is filtered off with suction, washed to neutrality with water and dried at 80° C.

This gives 58.5 parts of mixed crystal pigment. The spectrum is that of the mixed crystal pigment (FIG. 1). In the AM varnish, opaque coatings of high color strength and pure hue are obtained. The rheology is measured as 5 and the viscosity is 3.4". In PVC, colorings with a pure hue and strong, very reddish shade are obtained. The dispersibility is very good. The bleeding fastness is faultless. In PO, colorations of high color strength are obtained. The pigment is suitable for PO spin dyeing and for the production of thin films.

EXAMPLE 18

9 parts of mixed crystal pigment prepared in accordance with Example 1 and 1 part of pigment dispersant of the formula (II) are mixed mechanically. In this formula (II) P is the radical of linear unsubstituted quinacridone and X is the sulfonamido group (V) in which $R^1$ is a hydrogen atom, $R^2$ and $R^3$ are each an ethyl group, n is the number 3.0, o is the number 1.0 and m is the number 2.0.

A pigment preparation is obtained which gives transparent coatings of high color strength in the AM varnish. The rheology is measured as 5. The viscosity is 3.0 s. The solvent fastness is faultless.

EXAMPLE 19

380 parts of polyphosphoric acid, containing 85.0% $P_2O_5$, are introduced into a pressure vessel. Then 68.5 parts of 2,5-dianilinoterephthalic acid and 7.6 parts of 2,5-di(2-chloro-anilino)terephthalic acid are introduced with stirring at from 80 to 90° C. and the mixture is heated at 125° C. for 1 hour during which ring closure takes place to form the quinacridone. The reaction mixture is then introduced into a second pressure vessel where it is hydrolyzed under pressure and with stirring with a mixture of 1711 parts of 30% phosphoric acid at 140° C. During this hydrolysis the temperature rises to 155° C. The mixture is stirred at 155° C. for 0.5 hour. Then it is cooled to 60° C. and the mixed crystal crude pigment is filtered off with suction, washed to neutrality with water and dried at 80° C.

This gives 68.3 parts of mixed crystal crude pigment.

A stirred ball mill (manufacturer: Draiswerke GmbH, Mannheim) which is filled with 360 parts of zirconium mixed oxide beads of diameter 0.3–0.4 mm as grinding elements is charged with a suspension consisting of 88.3 parts of 1.0% sodium hydroxide solution, 8.5 parts of mixed crystal crude pigment and 3.2 parts of 100% isobutanol. Milling is carried out at 25° C. for 10 minutes with a peripheral stirrer speed of 15.6 m/s and with a specific power density of 3.1 kW per liter of milling space. The millbase suspension is subsequently sieved to remove the grinding elements, the grinding elements are rinsed with water and the combined millbase suspensions are filtered with suction, and the solid product is washed to neutrality and until free from isobutanol with water and dried at 80° C.

This gives 7.9 parts of mixed crystal pigment. The spectrum is that of the mixed crystal pigment (FIG. 1). In the AM varnish, transparent coatings of high color strength are obtained. The rheology is measured as 5. The viscosity is 3.3 s.

EXAMPLE 20

298 parts of polyphosphoric acid, containing 85.0% $P_2O_5$, are introduced into a pressure vessel. Then 53.7 parts of 2,5-dianilinoterephthalic acid and 6.0 parts of 2,5-di(4-N-methylcarboxamido-anilino)terephthalic acid are introduced with stirring at from 80 to 90° C. and the mixture is heated at 125° C. for 1 hour during which ring closure takes place to form the quinacridone. The reaction mixture is then introduced into a second pressure vessel where it is hydrolyzed under pressure and with stirring with a mixture of 1342 parts of water and 53 parts of xylene at 140° C. During this hydrolysis the temperature rises to 155° C. The mixture is stirred at 155° C. for 0.5 hour. Then it is cooled to 90° C. and the xylene is distilled off with steam. The mixture is then cooled to 60° C. and the mixed crystal prepigment is filtered off with suction, washed to neutrality with water and dried at 80° C.

This gives 53.6 parts of mixed crystal prepigment.

For the finishing operation, 10 parts of mixed crystal prepigment are introduced into 150 parts of dimethylformamide. The mixture is heated to boiling temperature and stirred at that temperature for 3 hours. Then it is cooled to 25° C. and the mixed crystal pigment is filtered off with suction, washed with water until free from dimethylformamide and dried at 80° C.

This gives 9.5 parts of mixed crystal pigment. The spectrum resembles that of the β phase (FIG. 3). In the AM varnish, opaque coatings are obtained. The rheology is measured as 5. The viscosity is 2.6 s.

EXAMPLE 21

382 parts of polyphosphoric acid, containing 85.0% $P_2O_5$, are introduced into a pressure vessel. Then 64.9 parts of 2,5-dianilinoterephthalic acid and 11.5 parts of 2,5-di(4-toluidino)terephthalic acid are introduced with stirring at from 80 to 90° C. and the mixture is heated at 125° C. for 1 hour during which ring closure takes place to form the quinacridone. The reaction mixture is then introduced into a second pressure vessel where it is hydrolyzed under pressure and with stirring with a mixture of 1721 parts of 30% phosphoric acid at 140° C. During this hydrolysis the temperature rises to 155° C. The mixture is stirred at 155° C. for 0.5 hour. It is then cooled to 60° C. and the mixed crystal prepigment is filtered off with suction and washed to neutrality with water. This gives 312 parts of a 22.0% pure mixed crystal prepigment presscake.

For the finishing operation, 45.5 parts of the prepigment presscake are introduced into a mixture of 64.5 parts of 1.55% sodium hydroxide solution, 50 parts of ethanol and 0.5 part of the sodium salt of an alkylphenol polyglycol ether sulfate. This mixture is heated to boiling temperature and stirred at that temperature for 3 hours. Then it is cooled to 25° C. and the mixed crystal pigment is filtered off with suction, washed to neutrality and until free from ethanol with water and dried at 80° C.

This gives 9.7 parts of mixed crystal pigment. The spectrum is that of the mixed crystal pigment (FIG. 1). In the AM varnish, transparent coatings of high color strength and very pure hue are obtained.

EXAMPLE 22

385 parts of polyphosphoric acid, containing 85.0% $P_2O_5$, are introduced into a pressure vessel. Then 69.3 parts of 2,5-dianilinoterephthalic acid and 7.7 parts of 2,5-di(3-chloro-anilino)terephthalic acid are introduced with stirring at from 80 to 90° C. and the mixture is heated at 125° C. for 1 hour during which ring closure takes place to form the quinacridone. The reaction mixture is then introduced into a second pressure vessel where it is hydrolyzed under pressure and with stirring with a mixture of 1733 parts of water at 140° C. During this hydrolysis the temperature rises to 160° C. The mixture is stirred at 160° C. for 0.5 hour. Then it is cooled to 60° C. and the mixed crystal pigment is filtered off with suction, washed to neutrality with water and dried at 80° C.

This gives 69.2 parts of mixed crystal prepigment.

For the finishing operation, 10 parts of mixed crystal prepigment are introduced into a mixture of 150 parts of chlorobenzene. This mixture is heated to boiling temperature and stirred at that temperature for 5 hours. It is then cooled to 90° C. and the chlorobenzene is distilled off with steam. The mixture is cooled to 60° C. and the mixed crystal pigment is filtered off with suction, washed to neutrality and until free from ethanol with water and dried at 80° C.

This gives 9.6 parts of mixed crystal pigment. The spectrum is that of the mixed crystal pigment (FIG. 1). In the AM varnish, opaque coatings are obtained. The rheology is measured as 5. The viscosity is 3.3 s.

TABLE 1

Figure 6:
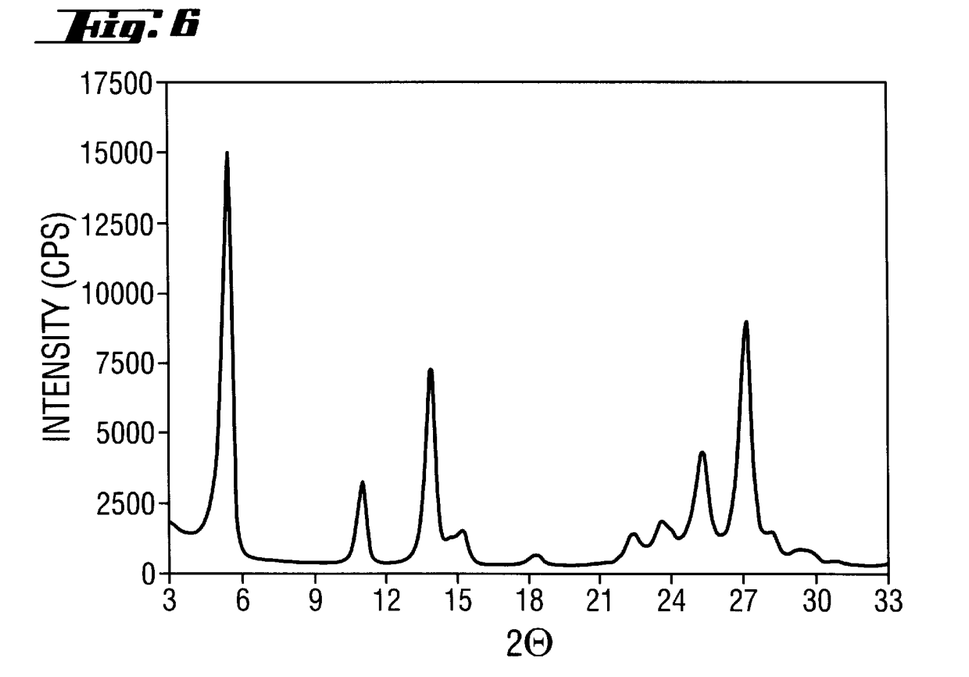
FIG. 6: 2,9-dimethylquinacridone (Comparative).

| FIG. 1 | | FIG. 2 | | FIG. 3 | | FIG. 4 | | FIG. 5 | | FIG. 6 | |
|---|---|---|---|---|---|---|---|---|---|---|---|
| 2Θ[°] | rel. int. | 2Θ[°] | rel. int. | 2Θ[°] | rel. int. | 2Θ[°] | rel. int. | 2Θ[°] | rel. int. | 2Θ[°] | rel. int. |
| 5.80 | 98 | 6.01 | 100 | 5.78 | 92 | 5.78 | 84 | 5.88 | 100 | 5.49 | 100 |
| 11.74 | 20 | 12.22 | 24 | 11.61 | 32 | 11.66 | 30 | 12.01 | 20 | 11.05 | 20 |
| 13.73 | 32 | 13.89 | 50 | 13.70 | 8 | 13.86 | 14 | 13.59 | 60 | 13.93 | 48 |
| 15.96 | 36 | | | 15.93 | 44 | 15.95 | 40 | 15.80 | 6 | 15.22 | 8 |
| 17.90 | 4 | | | 17.69 | 8 | 17.84 | 8 | | | 18.37 | 2 |
| 22.03 | 20 | 20.95 | 4 | 21.85 | 24 | 21.87 | 24 | 22.00 | 6 | 22.49 | 8 |
| 23.55 | 10 | | | 23.53 | 8 | 23.53 | 10 | 24.54 | 20 | 23.70 | 10 |
| | | 25.81 | 48 | | | 25.41 | 10 | 26.30 | 36 | 25.31 | 28 |
| 27.16 | 100 | 27.30 | 56 | 27.00 | 100 | 27.02 | 100 | 27.20 | 48 | 27.17 | 60 |

We claim:
1. A quinacridone mixed crystal pigment consisting of
   a) from 85 to 99% by weight of unsubstituted β-phase quinacridone of the formula (I)

(I)

in which $R^1$ and $R^2$ are hydrogen atoms and
   b) from 1 to 15% by weight of one or more substituted quinacridones of the formula (I) in which the substituents $R^1$ and $R^2$ are identical or different and are chlorine, bromine or fluorine atoms or $C_1$–$C_4$-alkyl, $C_1$–$C_4$-alkoxy or carboxamido groups which are optionally substituted by $C_1$–$C_6$-alkyl groups, and $R^1$ can additionally be hydrogen.

2. A quinacridone mixed crystal pigment as claimed in claim 1 comprising one or two compounds in accordance with b) in which $R^1$ is hydrogen, chlorine, methyl or carboxamido, and $R^2$ is chlorine, methyl or carboxamido.

3. A process for preparing a quinacridone mixed crystal pigment which comprises
   cyclizing a 2,5-dianilinoterephthalic acid having a formula and a substituted 2,5-dianilinoterephthalic acid having a formula wherein $R^1$ and $R^2$ are identical or different and are chlorine, bromine or fluorine atoms or $C_1$–$C_4$-alkyl, $C_1$–$C_4$-alkoxy or carboxamido groups which are optionally substituted by $C_1$–$C_6$-alkyl groups, and $R^1$ can additionally be hydrogens in a ratio of from 85:15 to 99:1, in the presence of polyphosphoric acid, polyphosphoric esters or a combination thereof to form a ring closure mixture after cyclization, hydrolyzing the ring closure mixture which is present after cyclization at a temperature of at least 110° C. using water or dilute phosphoric acid, under pressure to form a mixed crystal pigment and then isolating the mixed crystal pigment, directly or following a fine division step, a finishing treatment or both.

4. The process as claimed in claim 3, wherein the ratio is from 87:13 to 95:5.

5. The process as claimed in claim 3, wherein the polyphosphoric acid or polyphosphoric ester used in the cyclization has a $P_2O_5$ content of between 80 and 85% by weight.

6. The process as claimed in claim 3, wherein the polyphosphoric acid or polyphosphoric ester used in the cyclization has a $P_2O_5$ content of between 83 and 85% by weight.

7. The process as claimed in claim 3, wherein the ring closure mixture which is present after cyclization is hydrolyzed at a temperature of from 110 to 180° C.

8. The process as claimed in claim 3, wherein the ring closure mixture which is present after cyclization is hydrolyzed at a temperature of from 135 to 165° C.

9. The process as claimed in claim 3, wherein a pigment dispersant of the formula (II)

P—Xm           (II)

is employed in which

P is an m-valent radical of a linear quinacridone of the formula (I) in which $R^1$ and $R^2$ are identical and are hydrogen atoms or methyl groups, X is a group of the formula (III)

—COOM           (III)

or a group of the formula (IV)

—SO$_3$M           (IV)

in which

M is the hydrogen ion $H^+$ or the equivalent $M^{r+}/r$ of an r-valent metal cation, where r is in each case at each occurrence one of the numbers 1, 2 and 3, or an ammonium ion having the structure $N^+R^3R^4R^5R^6$, where the substituents $R^3$, $R^4$, $R^5$ and $R^6$ on the quaternary nitrogen atom are each individually and independently of one another hydrogen atoms or $C_1$–$C_{30}$-alkyl, $C_2$–$C_{30}$-alkenyl or $C_5$–$C_{30}$-cycloalkyl groups, which can be substituted by hydroxyl, di-($C_1$–$C_4$-alkyl)amino, carboxyl or carboxamide groups, and m is a number between 1 and 4, or

X is a group of the formula (V)

(V)

in which $R^8$ and $R^9$ independently of one another are each a hydrogen atom, a $C_1$–$C_{20}$-alkyl or $C_2$–$C_{20}$-alkenyl group or a $C_5$–$C_7$-cycloalkyl group, or in which $R^8$ and $R^9$, together with the adjacent nitrogen atom, form an aliphatic or aromatic, five- or six-membered heterocyclic ring system having in each case from 1 to 3 identical or different ring-member heteroatoms from the series consisting of nitrogen, oxygen or sulfur, $R^7$ is a hydrogen atom or a $C_1$–$C_4$-alkyl group, n is a number from 1 to 6, o is the number 0 or 1, and m is a number from 1 to 4, or X is a group of the formula (VI)

(VI)

in which $R^{10}$, $R^{12}$ and $R^{13}$ are each a hydrogen, fluorine, chlorine or bromine atom and $R^{11}$ is a hydrogen, fluorine, chlorine or bromine atom or is a nitro, $C_1$–$C_5$-alkyl, $C_1$–$C_6$-alkoxy or benzoylamino group, and m is a number from 1 to 4.

10. The process as claimed in claim 3, wherein the fine division step is dry or wet grinding.

11. The process as claimed in claim 3, wherein the finishing treatment is carried out with alkanols or carboxamides, alone or in the presence of water or an aqueous alkali.

12. A method of pigmenting a material selected from the group consisting of plastics, varnishes, paints, spinning solutions and printing inks, comprising the step of adding a quinacridone mixed crystal pigment as claimed in claim 1 to said material.

13. A method of pigmenting a material selected from the group consisting of cellulose ethers, cellulose esters, natural resins, polyolefins, polyvinyl chloride, polyacrylonitrile, polyacrylates, polyamides, polyurethanes, polyesters, rubber, casein and silicone comprising the step of adding a quinacridone mixed crystal pigment as claimed in claim 1 to said material.

* * * * *